United States Patent [19]

Odagawa

[11] Patent Number: 5,742,923

[45] Date of Patent: Apr. 21, 1998

[54] METHOD OF CORRECTING DISTANCE ERROR OF NAVIGATION APPARATUS AND NAVIGATION APPARATUS

[75] Inventor: Satoshi Odagawa, Kawagoe, Japan

[73] Assignee: Pioneer Electronic Corporation, Tokyo-to, Japan

[21] Appl. No.: 137,267

[22] Filed: Oct. 18, 1993

[30] Foreign Application Priority Data

Oct. 20, 1992 [JP] Japan .................................. 4-281252

[51] Int. Cl.$^6$ ...................................................... G06G 7/78
[52] U.S. Cl. ........................... 701/207; 701/201; 701/205; 701/210; 701/217; 701/224; 73/178 R; 340/988; 342/357; 342/457
[58] Field of Search ........................ 364/449, 453, 364/424.01, 450, 457, 461, 444, 571.05; 701/201, 205, 207, 210, 213, 224, 217, 220; 73/178 R; 340/988, 990, 995; 342/357

[56] References Cited

U.S. PATENT DOCUMENTS

| | | | |
|---|---|---|---|
| 4,520,445 | 5/1985 | Keearns | 364/450 |
| 4,713,767 | 12/1987 | Sato et al. | 364/449 |
| 4,758,959 | 7/1988 | Thoone et al. | 364/449 |
| 4,796,191 | 1/1989 | Honey et al. | 364/449 |
| 4,807,127 | 2/1989 | Tenmoku et al. | 364/449 |
| 5,003,306 | 3/1991 | Takahashi et al. | 364/449 |
| 5,119,301 | 6/1992 | Shimizu et al. | 364/450 |
| 5,159,556 | 10/1992 | Schorter | 364/449 |
| 5,337,243 | 8/1994 | Shibata et al. | 364/450 |

Primary Examiner—Jacques H. Louis-Jacques
Assistant Examiner—Thai Phan
Attorney, Agent, or Firm—Young & Thompson

[57] ABSTRACT

A navigation apparatus displays a present position and an advance direction of a movable body on map information including road position information, and includes a measuring device for detecting a travelling distance and the advance direction and periodically measuring an advanced position, to update the present position. A method of correcting a distance error of the navigation apparatus includes the steps of: setting the present position as a first present position candidacy; positioning a plurality of second present position candidacies on positions corresponding to the road forward and backward of the first present position candidacy; measuring the advanced position with respect to each of the first and second present position candidacies as a standard position, on the basis of the detected travelling distance and advance direction; calculating a correction amount of each measured advanced position, to correct each measured advanced position onto a position corresponding to the road according to the road position information; selecting one of the first and second present position candidacies, which calculated correction amount is the minimum; and updating the present position by the corrected advanced position of the selected one candidacy.

10 Claims, 6 Drawing Sheets

METHOD OF CORRECTING DISTANCE ERROR OF NAVIGATION APPARATUS AND NAVIGATION APPARATUS

BACKGROUND OF THE INVENTION

1. Field of the Invention

The present invention relates to a method of correcting a distance error of a navigation apparatus which carries out an indication display of a present position, an advance direction etc. of a movable body, on a map, so as to support the operation of the movable body, such as a vehicle. More specifically, this invention relates to a method of correcting a distance error of a navigation apparatus which corrects the shift between a measured present position and an actual position on a road on which the movable body is travelling, so as to improve the accuracy of the present position on the map.

2. Description of the Related Arts

In a navigation apparatus mounted on a vehicle etc., it is required to measure a self-vehicle position and an advance direction of the vehicle precisely, in order to precisely and rapidly display the map information, which corresponds to the self-vehicle position i.e. the present position, a self-vehicle position mark, a mark indicating the advance direction, and other information corresponding to a user's demand, by the display device etc. one after another, so as to show it to a driver.

As a measurement system to perform the measurements of the self-vehicle position and the advance direction of the vehicle, there is one type of measurement system, which receives the electric waves from the GPS (Global Positioning System) satellites and performs a calculation based on the received electric waves (hereinbelow it is referred as "GPS measurement"). There is another type of measurement system, which employs an angular speed sensor such as a gyroscope, an azimuth sensor such as an earth magnetism sensor, and a travelling sensor for detecting a travelling distance, etc., and which calculates the present position from those detection outputs (hereinbelow, it is referred as "a self-sustaining type measurement"). The GPS measurement is quite useful, since it has such an advantage that it is not necessary to set in advance the position of the self-vehicle on the map, and that the measurement error of the position of the self-vehicle is small enough to obtain a high reliability. However, the GPS measurement has such a defect that the measurement cannot be performed in places located behind something, such as a building, forest, and an inside of a tunnel. The self-sustaining type measurement tends to be influenced by an accumulated error, an influence of temperature change, and a situation inside and outside of the vehicle, and especially, the earth magnetism sensor tends to be influenced by an iron bridge. For this reason, by the self-sustaining type measurement, the detected data do not always have good accuracy. In this manner, each measurement system is not necessarily perfect. Therefore, the navigation system may be constituted to use both the GPS measurement and the self-sustaining type measurement, so as to compensate for the defects inherent in each type of measurement and to improve the accuracy.

The travelling distance detected by the travelling sensor used for the self-sustaining type measurement is obtained by, for example, counting a vehicle-speed pulse, which corresponds to the rotation of a drive shaft of a vehicle for a predetermined time period, and multiplying a distance per 1 pulse on the number of counts. Naturally, in such a measurement of the travelling distance, an error occurs in the distance per 1 pulse due to the change in the pneumatics of the tire and the number of people riding in the vehicles. For this reason, an exact travelling distance cannot be detected without processing.

Therefore, as shown in the following expression (1), an exact distance may be obtained by multiplying a distance correction coefficient k, which is increased and decreased by map-matching.

$$d = kln \qquad (1)$$

wherein d: travelling distance k: distance correction coefficient l: travelling distance per 1 pulse n: number of the vehicle-speed pulses The increase and decrease of the distance correction coefficient k is performed by detecting an overrun or an underrun by map-matching in the case wherein there is a change in azimuth greater than a predetermined angle in a predetermined time period e.g. in case of turning at a crossing or corner, and by increasing and decreasing the coefficient in correspondence with the detection amount. As a result, the accuracy in the travelling distance can be improved.

As shown in FIG. 1, for example, it is assumed that the travelling locus of the calculated self-vehicle position overruns with respect to the road R by the error in the measured travelling distance, as shown in a dotted line b in the figure, when turning to the right at the crossing A. In this case, the self-vehicle position, which is calculated by the measured travelling distance, and the position of the road R according to the road data, do not match with each other, so that drawing of the self-vehicle position into the road R is performed by map-matching. The increase and decrease of the distance correction coefficient k is performed in correspondence with the amount of drawing-in at that time, and the distance error is absorbed.

The error in the travelling distance measured by the travelling sensor is absorbed at the crossings etc. in the related arts, as described above. Therefore, in case of driving on a general way, since the frequency of turns at the crossings etc., is rather high, and thus the error in the travelling distance is absorbed by map-matching each time the vehicle turns at the crossings, the exact present position is calculated and displayed on the map.

However, in case of driving straight for a long distance without turning e.g. driving on a highway etc., since there is no crossing or corner for absorbing the error in the travelling distance, according to the above mentioned related art, there occurs a problem that the errors are accumulated and become large in the detected travelling distance. For example, when getting out of a highway at an interchange, a shift is generated between the self-vehicle position presently displayed on the map, and the actual position of the interchange, due to the error in the travelling distance up to the interchange, so that there may arise a possibility that one cannot get out at the interchange.

SUMMARY OF THE INVENTION

It is therefore an object of the present invention to provide a method of correcting a distance error of the navigation apparatus, and a navigation apparatus, by which the error in the travelling distance measured by a travelling sensor, can be corrected, even in case of driving straight for a long distance without turning e.g. driving on a highway where no crossing or corner exists.

According to the present invention, the above object can be achieved by a method of correcting a distance error of a navigation apparatus for displaying at least a present position and an advance direction of a movable body on map information including road position information. The apparatus includes a measuring device for detecting a travelling distance and the advance direction and periodically measuring an advanced position, to which the movable body is assumed to have advanced from the present position, to update the present position by the advanced position. The method includes the steps of: setting the present position as a first present position candidacy; positioning a plurality of second present position candidacies on positions corresponding to the road forward and backward of the first present position candidacy; measuring the advanced position with respect to each of the first and second present position candidacies as a standard position, on the basis of the detected travelling distance and advance direction; calculating a correction amount of each measured advanced position, to correct each measured advanced position onto a position corresponding to the road according to the road position information; selecting one of the first and second present position candidacies, which calculated correction amount is the minimum; and updating the present position by the corrected advanced position of the selected one candidacy.

In the method of the present invention, a plurality of present position candidacies are set on the road forward and backward of the updated present position. An advanced position is measured on the basis of the detected travelling distance and the detected advance direction for each candidacy, respectively. Such a measurement may be preferably performed for a predetermined time period. And, a positional correction is performed to move the advanced position onto a road, for each candidacy, and the correction amounts of the candidacies are compared with each other. At this time, the positional correction is preferably repeated by measuring the next advanced position from the corrected advanced position on the road. Then, the deviation or average values of the positional correction amounts of predetermined numbers, as the correction amounts, are compared with each other. The present position candidacy, which correction amount becomes the minimum as the result of the comparison, is judged to have a good relation with the road, on which the vehicle is travelling, and the position on the road after the positional correction by use of this candidacy, is updated as a new present position.

Consequently, the detection error of the travelling distance on a highway etc., can be corrected, even though there is no crossing or corner causing the azimuth change to enable the map-matching according to related art.

According to the present invention, the above object can be also achieved by a navigation apparatus provided with: a memory device for storing map information including road position information; a display device for displaying at least a present position and an advance direction of a movable body on the map information; a detecting device for detecting a travelling distance and the advance direction; and a controlling device for setting the present position as a first present position candidacy, positioning a plurality of second present position candidacies on positions corresponding to the road forward and backward of the first present position candidacy, measuring an advanced position to which the movable body is assumed to have advanced from each of the first and second present position candidacies as a standard position on the basis of the detected travelling distance and advance direction, calculating a correction amount of each measured advanced position to correct each measured advanced position onto a position corresponding to the road according to the road position information, selecting one of the first and second present position candidacies, which calculated correction amount is the minimum, and updating the present position by the corrected advanced position of the selected one candidacy.

By thus constructed navigation apparatus, the above mentioned method of correcting the distance error can be carried out, and therefore, the detection error of the travelling distance on a highway etc., can be corrected according to the navigation apparatus of the present invention.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, an embodiment of the present invention will be now explained.

Firstly, the basic construction of the present invention will be explained in view of FIG. 2, which is a flow chart of a method of correcting a distance error of the navigation apparatus of the present invention.

Figure 1:
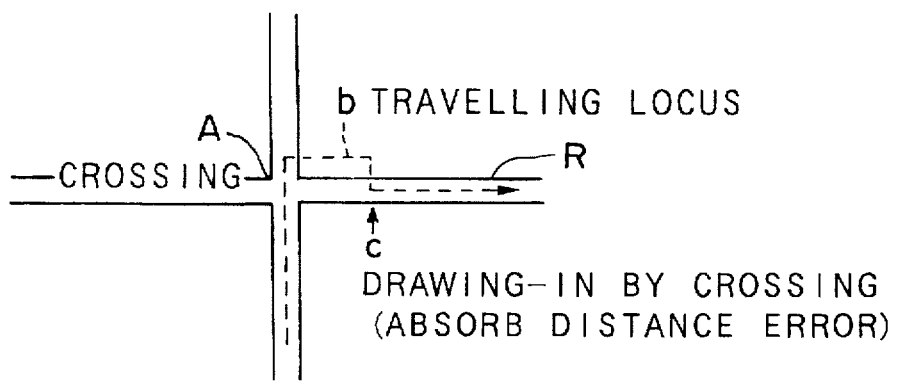
FIG. 1 is a diagram indicating a distance-error correction at a crossing.
Figure 2:
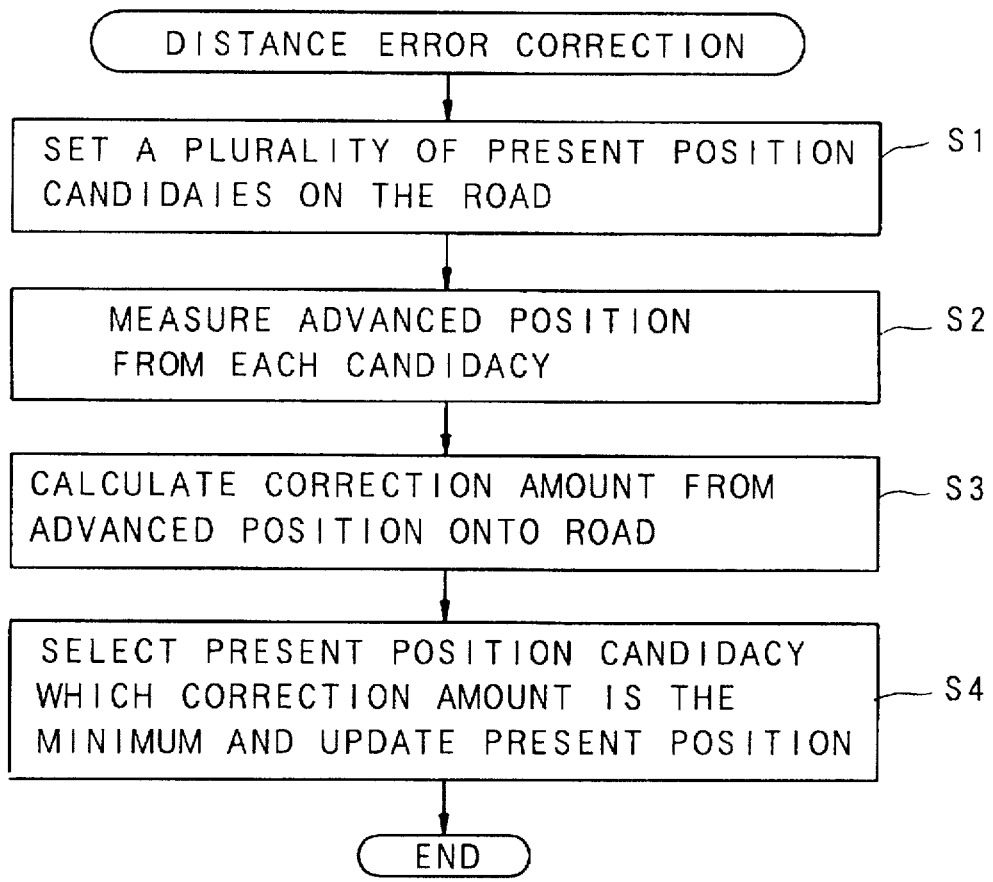
FIG. 2 is a flow chart of a method of correcting a distance error of a navigation apparatus, according to the present invention.

As shown in FIG. 2, the present invention is a method of correcting a distance error of a navigation apparatus. The navigation apparatus has a measuring device for detecting a travelling distance from a present position and an advance direction of a movable body, and for periodically measuring an advanced position of the movable body, for updating the present position by correcting the advanced position to a position on a road by use of road position information, and for displaying at least information as for the updated present position and the advance direction of the movable body. The method includes the steps of: a first step S1 of setting the present position as a first present position candidacy, and of positioning a plurality of present position candidacies on the road forward and backward of the first present position candidacy; a second step S2 of measuring each advanced position with respect to each candidacy as a standard position; a third step S3 of calculating each correction amount to a road, from the advanced position measured in the second step S2; and a fourth step S4 of selecting the present position candidacy, which calculated correction amount becomes the minimum, and updating the present position by use of thus selected candidacy.

Figure 3:
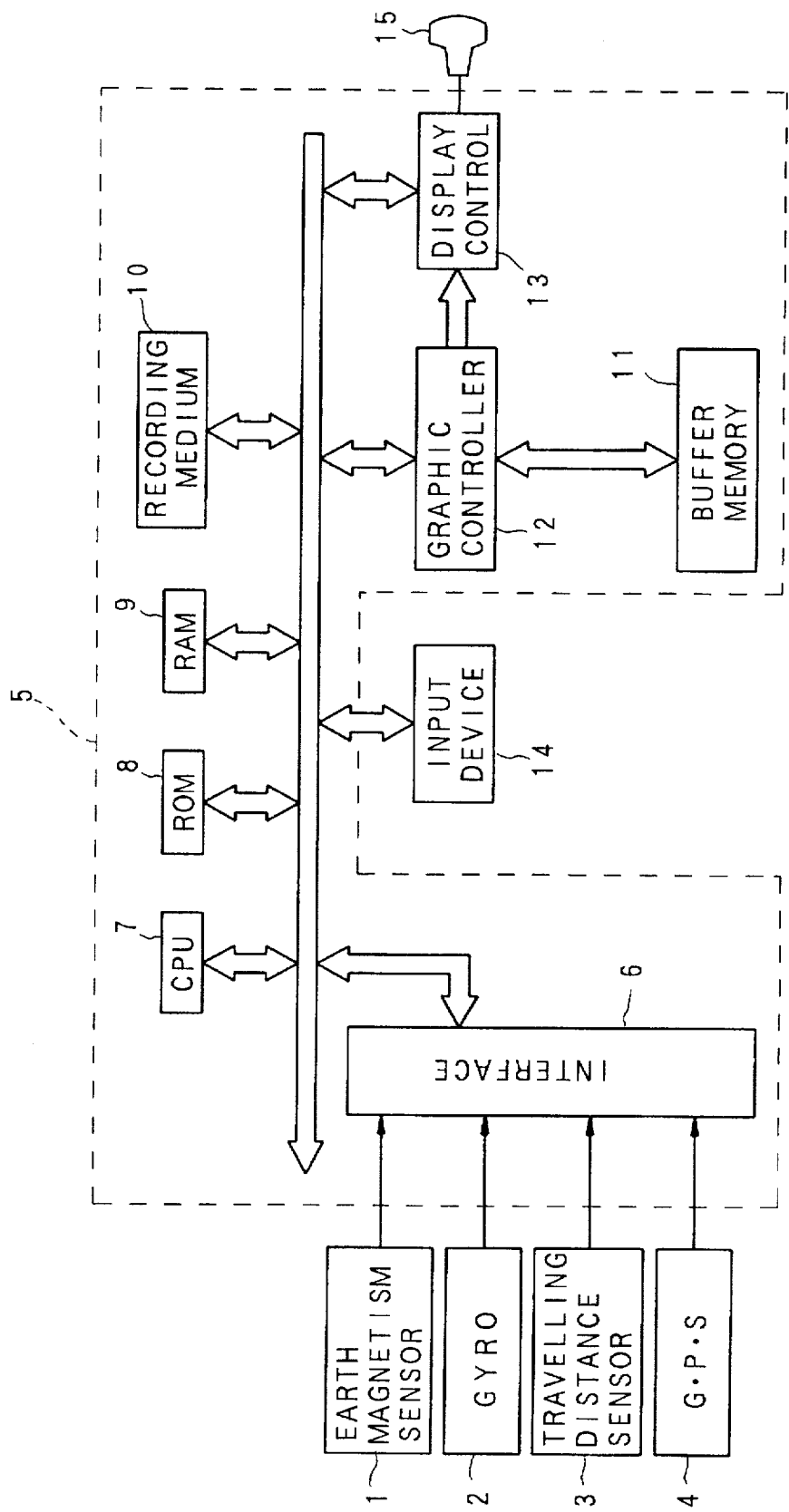
FIG. 3 is a constitutional figure of one embodiment of an on-vehicle navigation apparatus to perform the method of correcting the distance error of the present invention.

FIG. 3 depicts one embodiment of an on-vehicle navigation apparatus which carries out a method of correcting a distance error of the present invention.

As shown in FIG. 3, an on-vehicle navigation apparatus of the present embodiment is provided with: an earth magnetism sensor 1, which is an azimuth detection sensor, for outputting absolute azimuth angle data of a vehicle on the basis of a geomagnetism (earth magnetic field); a gyroscope 2, which is an angular speed sensor, for detecting an angular speed accompanied by a direction change of the vehicle, and outputting angular speed data; a travelling distance sensor 3 for detecting whether the vehicle is moving or stopped; outputting the state, and outputting data of the travelling speed and the travelling distance of the vehicle; a GPS measurement device 4 for receiving the electric waves from a plurality of GPS satellites, calculating and generating data as for the latitude, the longitude, the height, and the advance direction, to output them; a system controller 5 for performing various processes, such as calculations and controls; an input device 14, which is an apparatus for carrying out an operation input to the system controller 5; and a display device 15, which is a LCD (Liquid Crystal Display) apparatus, or a CRT (Cathode Ray Tube) etc.

The system controller 5 is provided with: an interface 6, to which the outputs of the earth magnetism sensor 1, the gyroscope 2, the travelling distance sensor 3, and the GPS measurement device 4 are inputted, and which performs the A/D conversion etc.; a CPU 7 (Central Processing Unit) for performing various operations and controls, according to a program; a ROM 8 (Read Only Memory), to which various kinds of process programs, and other necessary information, are written beforehand; a RAM 9 (Random Access Memory) for performing writing and reading operations, which are necessary to execute the program; a recording medium 10, which may consists of a CD-ROM, an IC card, etc., to which digitized map information including road position information etc. is recorded; a buffer memory 11, which consists of a V-RAM (video RAM) etc., and which is a frame buffer for temporarily storing image information data which are developed to be instantly displayed; a graphic controller 12 for drawing graphic data which are sent by instructions of the CPU 7, such as map information, into the buffer memory 11, and outputting the drawing data as image information; and a display control circuit 13, to which image information outputted from the graphic controller 12 is inputted, for controlling the image display of the display device 15.

Nextly, the operation of thus constructed navigation apparatus will be explained.

When the navigation apparatus of FIG. 3, is started, the system controller 5 reads out the information, to access the map display information, and the display information of the self-vehicle position mark etc. from the recording medium 10, and stores them to the RAM 9. Nextly, the controller 5 reads out the latitude and longitude data, which are the self-vehicle position information, and the advance direction data of the vehicle, from the GPS measurement device 4, and reads out the map data corresponding to the self-vehicle position from the recording medium 10. The controller 5 sends them to the graphic controller 12, and displays the map of the present position on the display device 15. Further, the controller 5 performs a process to display the self-vehicle position mark onto the map by use of the self-vehicle position information and the advance direction, and successively, the controller 5 reads out the self-vehicle position information and the advance direction data from the GPS measurement device 4, periodically, and by use of thus read information, performs an updating process of the display position and direction of the self-vehicle position mark, and, if necessary, the displayed map. In the updating process of the self-vehicle position, the controller 5 periodically reads the output data of the earth magnetism sensor 1, the gyroscope 2, and the travelling distance sensor 3, and computes the self-vehicle position and the advance direction, by performing a predetermined operation from the output data. Then, the controller 5 compares the computed data with the data from the GPS measurement device 4, and adjusts a mutual error to perform the correction process.

With respect to the self-vehicle position computed from the output data of the earth magnetism sensor 1, the gyroscope 2, and the travelling distance sensor 3, the measured error in the travelling distance is absorbed by the map-matching at the position where the advance direction is changed, at the time in the travelling condition in which the advance direction is frequently changed at a crossing or corner etc., so that the distance correction coefficient is adjusted, and that the process to improve the accuracy of the present position is performed, as in the related art.

Namely, the exact distance is obtained by multiplying the distance correction coefficient k, which is increased and decreased by map-matching as indicated by the aforementioned expression (1). The increase and decrease of the distance correction coefficient k is performed by detecting an overrun or an underrun by map-matching in case there is a change in azimuth more than a predetermined angle in a predetermined time period e.g. in case of turning at a crossing or corner, and by increasing and decreasing the coefficient in correspondence with the detection amount.

In addition to this error absorbing procedure, in the present embodiment, the travelling distance or the travelling time from the point where the error of the travelling distance is absorbed at the azimuth changing point, such as a crossing, is measured. It is judged to be the long distance straight travel on a highway etc., where no point to absorb the travelling distance error exists, if the distance error due to the azimuth change is not absorbed even when it has traveled for the predetermined distance or for the predetermined time period. The process of the distance error correction is performed as follows.

Figure 4A:
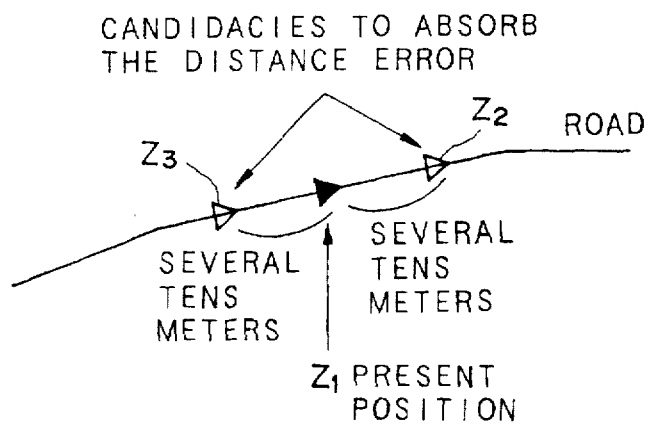
FIG. 4, which consist of FIG. 4A and FIG. 4B, are diagrams indicating a distance error correcting process in the embodiment.
Figure 4B:
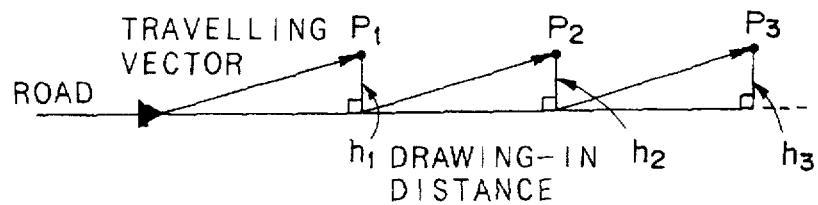

In the distance-error correcting process of the present embodiment, as shown in FIG. 4 A, firstly, the updated present position Z1 is set as a first candidacy for the present position, and second and third candidacies for the present position to absorb the distance-error, are set on the road forward and backward of it. The distance from the first candidacy Z1 for the present position, to the candidacies Z2 and Z3 set here to absorb the distance error, are about several ten meters, for example. And, those distances are decided by taking into consideration the error factors, such as the travelling speed at the moment. As shown in FIG. 4B, after setting the candidacies for the present position, the travelling vector which consists of a travelling distance and an advance direction for every predetermined term, is obtained as for each candidacy, and advanced-positions P1, P2, P3, . . . , are computed, to perform the positional correction by drawing-in the advanced positions onto the road by the map-matching. And, as for each candidacy, the drawing-in distances h1, h2, h3, . . . , are sampled by the predetermined number. The deviation or average value of the sampled drawing-in distances, is obtained and monitored for each candidacy. Since the candidacy which deviation or average value is the minimum, has a good relationship with the road, the drawn-in position according to this candidacy is judged to be the correct present position, to perform updating. After updating, the sampling data etc. of other candidacies are erased. The process flow chart of the above distance error correction is shown in FIG. 5 and FIG. 6.

Figure 5:
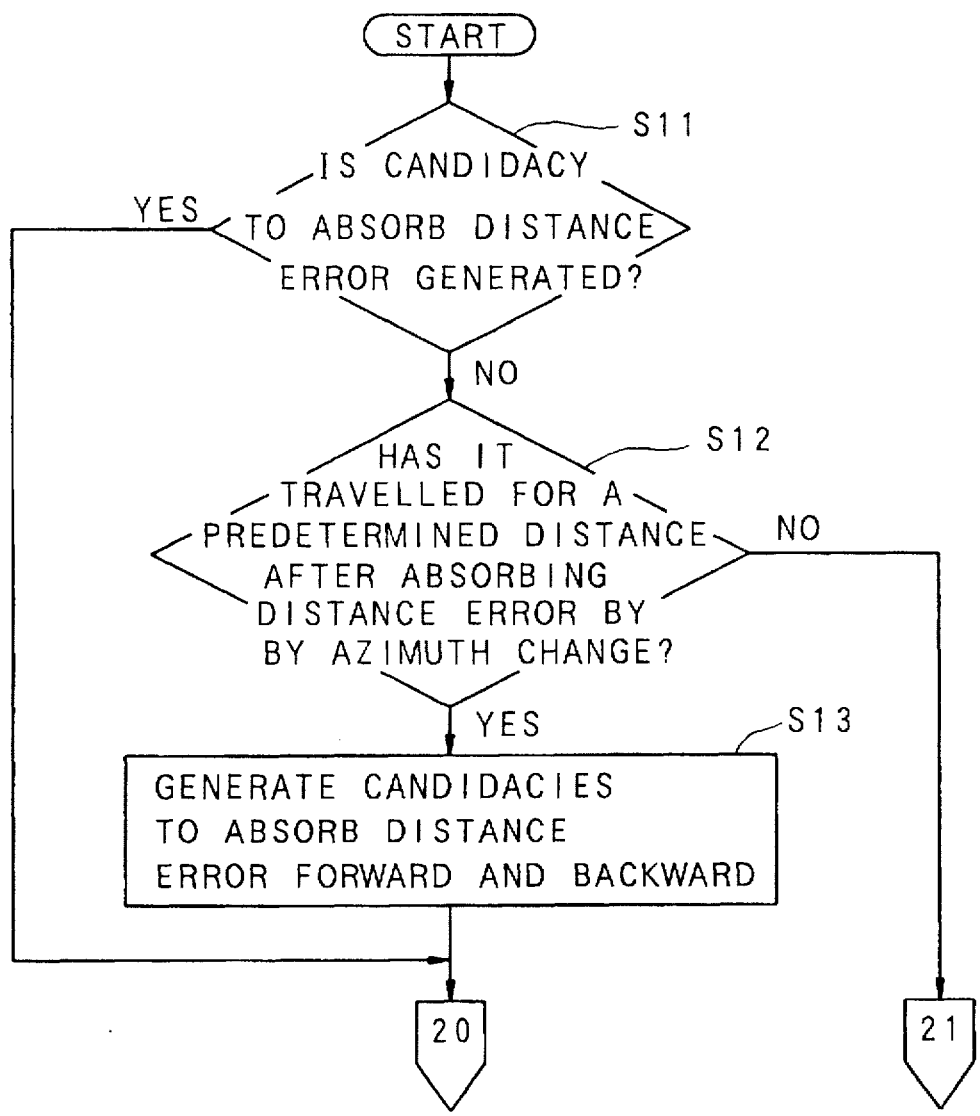
FIG. 5 is a flow chart (1) of the distance error correcting process in the embodiment.
Figure 6:
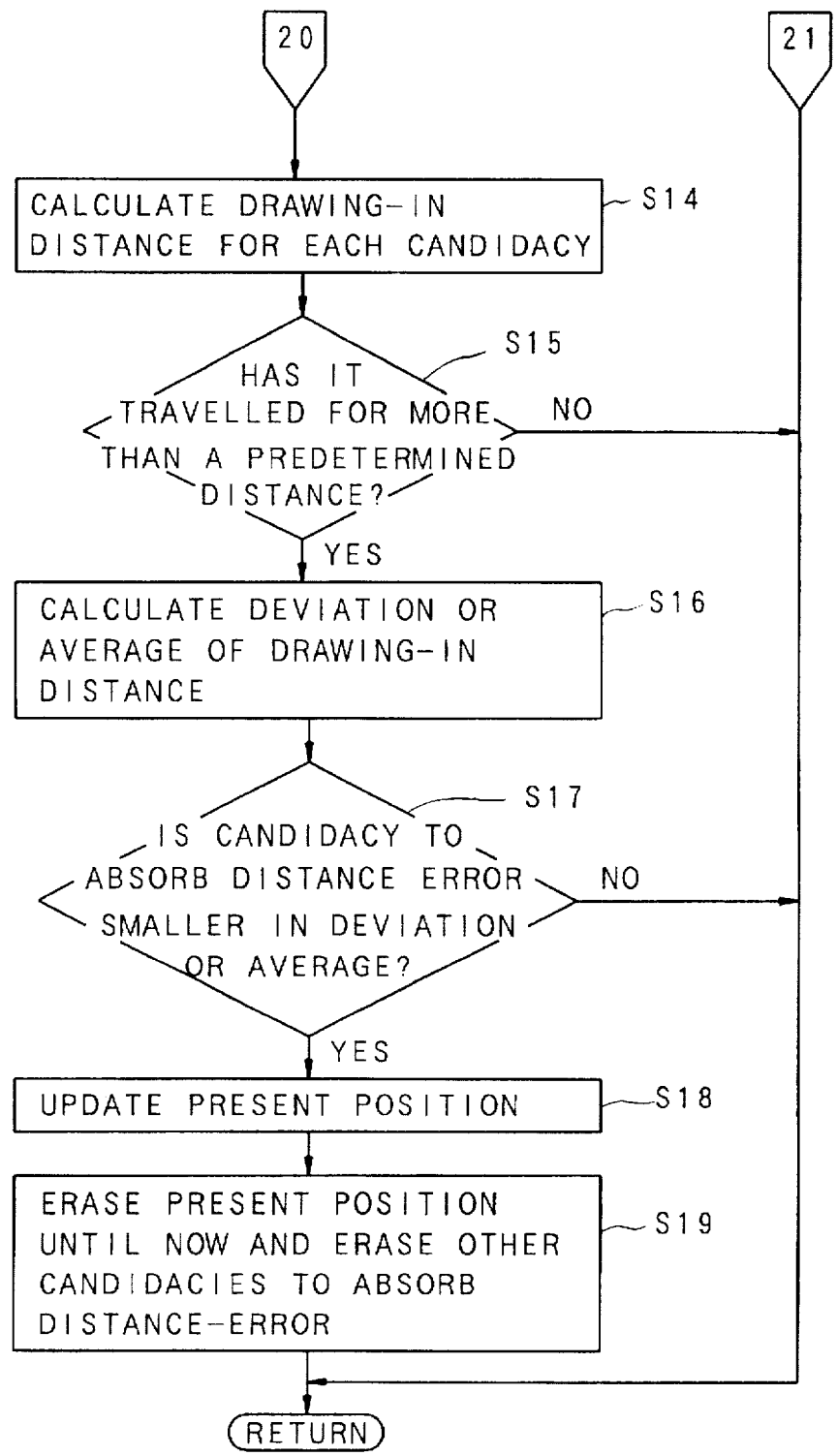
FIG. 6 is a flow chart (2) of the distance error correcting process in the embodiment.

Namely, in FIG. 5, it is firstly judged whether or not a candidacy to absorb the distance error correction is generated (step S11). If the candidacy is generated (YES), the flow is shifted to the step S14 of FIG. 6.

On the other hand, if the candidacy is not generated (NO) at the step S11, it is further judged whether or not it has travelled for a predetermined distance, after absorbing the distance error by the azimuth change (step S12). If it has travelled (YES), candidacies to absorb the distance error, are generated forward and backward (step S13), and then the flow is proceeds to the step S14 of FIG. 6.

On the other hand, if it has not travelled (NO) at the step S12, the operation is ended.

In FIG. 6, nextly, the drawing-in distance of each candidacy is calculated (step S14), and it is judged whether or not it has travelled for more than a predetermined distance (step S15). If it is judged that it has not travelled (NO), the operation is ended.

On the other hand, if it is judged that it has travelled (YES) at the step S15, the deviation or average value of the drawing-in distances are calculated (step S16), and it is further judged whether or not the candidacy to absorb the distance error is smaller in deviation or average (step S17). If it is judged smaller (YES), the present position is updated (step S18), and the data as for the present position until now, and other candidacies to absorb the distance error are erased (step S19), and the operation is ended.

If it is judged not-smaller (NO) at the step S17, the operation is ended.

In this manner, for example, when the advanced position from the second candidacy Z2 for the present position set up before the first candidacy Z1 for the present position as a result of monitoring the deviation or average value of the drawing-in distance of each candidacy, is judged to be a more correct present position, the drawing-in position on the road from the advanced position of the second candidacy Z2 for the present position is updated as the new present position. The advanced position data and the sampling data of the first candidacy Z1 for the present position set up until then, and data as for the third candidacy Z3 for the present position set at the backward of it, are erased. When the present position is newly set up by this process, the above mentioned distance-error correcting process is repeated continuously or after a predetermined time interval has passed, so that the travelling distance error is absorbed. Thereby, the present position can be corrected at the stage where the distance error is still small, and travelling can be made in a condition where the error is sufficiently absorbed.

In addition, in the above distance error correcting process, the coefficient used for the calculation of the travelling distance may be corrected according to the result of the distance error correcting process, at the time of travelling straight. For example, the coefficient may be increased, if the candidacy generated backward of the present position is judged to be more right, and it may be decreased if the candidacy generated forward of the present position is judged to be more right. Thereby, the travelling distance is obtained more correctly, and thus the accuracy of the present position can be improved.

Moreover, in the above mentioned distance error correcting process, the drawing-in distance in the map-matching is monitored as the correction amount. However, since the drawing-in distance here is converted by the perpendicular line to the road from the measured advanced position P1, P2, P3, . . . , as can be understood by FIG. 4B, in fact, an error is generated to the travelling distance. When this error becomes in such a degree that it cannot be disregarded, monitoring may be performed by use of the angle between the travelling vector and the road as the correction amount.

Furthermore, in the above mentioned distance error correcting process, the predetermined number of the drawing-in distances as the correction amounts are sampled, and the deviation or average value is calculated and monitored. However, when measuring 1 time of the advance position by a long travelling distance, the right present position may be determined by simply comparing 1 time of the correction amount.

Moreover, in the above mentioned distance error correcting process, the candidacies to absorb the distance error, are set to two positions forward and backward of the present position. However, more candidacies may be set and the deviation or average value of each correction amount, may be monitored, so as to further improve the accuracy of the distance error absorption.

As explained above, according to the distance error correcting method of the navigation apparatus of the present invention, even in a long distance straight movement, such as a movement on a highway, where no crossing or corner etc. to correct the error of the measured travelling distance, exists, the correction can be performed while the generation of the distance error is still small. Thus, the accuracy of the present position can be improved, and, for example, such a situation that one cannot get out of the highway at the interchange, due to the disagreement between the present position on the displayed map, and the position of the actual road, can be avoided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A method of correcting a distance error of a navigation apparatus for displaying at least a present position and an advance direction of a movable body on map information including road position information, said apparatus including a measuring means for detecting a travelling distance and the advance direction and periodically measuring an advanced position, to which the movable body is assumed to have advanced from the present position, to update the present position by the advanced position, said method comprising the steps of:
  setting the present position as a first present position candidacy;
  positioning a plurality of second present position candidacies on positions corresponding to the road forward and backward of the first present position candidacy;
  measuring the advanced position with respect to each of the first and second present position candidacies as a standard position, on the basis of the detected travelling distance and advance direction;
  calculating a correction amount of each measured advanced position, to correct each measured advanced position onto a position corresponding to the road according to the road position information;

selecting one of the first and second present position candidacies, which calculated correction amount is the minimum; and updating the present position by the corrected advanced position of the selected one candidacy.

2. A method according to claim 1, further comprising the step of judging whether or not the movable body has travelled for a predetermined distance after a map-matching is performed on the basis of an azimuth change of the movable body at a crossing or corner, the first present position candidacy being set and the second present position candidacies being positioned if the movable body is judged to have travelled for the predetermined distance.

3. A method according to claim 1, further comprising the step of judging whether or not the movable body has travelled for a predetermined time period after a map-matching is performed on the basis of an azimuth change of the movable body at a crossing or corner, the first present position candidacy being set and the second present position candidacies being positioned if the movable body is judged to have travelled for the predetermined time period.

4. A method according to claim 1, wherein said calculating step comprises the steps of: obtaining a travelling vector consisting of the travelling distance and the advance direction with respect to each candidacy; and calculating the correction amount according to a positional relationship of the travelling vector with respect to the road.

5. A method according to claim 1, wherein, in said calculating step, the correction amount is calculated by drawing a perpendicular line form the advanced position to the road.

6. A method according to claim 1, wherein said selecting step comprises the steps of: periodically sampling the correction amount for each candidacy; obtaining a deviation or average value of the correction amount for each candidacy; and selecting one of the candidacies, which correction amount is the minimum according to the obtained deviation or average value.

7. A method according to claim 1, further comprising the step of erasing the measured advanced position and the calculated correction amount of the candidacies other than the selected one candidacy after the selecting step.

8. A method according to claim 1, further comprising the step of correcting the detected travelling distance by multiplying a distance correction coefficient, which is increased if the second present position candidacy backward of the present position is selected, and which is decreased if the second present position candidacy forward of the present position is selected.

9. A navigation apparatus comprising:

a memory means for storing map information including road position information;

a display means for displaying at least a present position and an advance direction of a movable body on the map information;

a detecting means for detecting a travelling distance and the advance direction; and a controlling means for setting the present position as a first present position candidacy, positioning a plurality of second present position candidacies on positions corresponding to the road forward and backward of the first present position candidacy, measuring an advanced position to which the movable body is assumed to have advanced from each of the first and second present position candidacies as a standard position on the basis of the detected travelling distance and advance direction, calculating a correction amount of each measured advanced position to correct each measured advanced position onto a position corresponding to the road according to the road position information, selecting one of the first and second present position candidacies, which calculated correction amount is the minimum, and updating the present position by the corrected advanced position of the selected one candidacy.

10. A navigation apparatus according to claim 9, wherein said detecting means comprises at least one of an earth magnetism sensor, a gyroscope, a travelling distance sensor and a GPS (Global Positioning system) measuring device.

* * * * *